United States Patent [19]

Barracchini et al.

[11] Patent Number: 5,225,216
[45] Date of Patent: Jul. 6, 1993

[54] MOLD OPENING APPARATUS FOR BLOW MOLDING MACHINE

[75] Inventors: Dominic A. Barracchini, Beaver, Pa.; Thomas D. Cleland, Salem; Derris Cottrell, Rootstown, both of Ohio

[73] Assignee: NRM Corporation, Columbiana, Ohio

[21] Appl. No.: 714,849

[22] Filed: Jun. 13, 1991

[51] Int. Cl.⁵ ............................................. B29C 49/56
[52] U.S. Cl. ................................. 425/451.5; 425/540
[58] Field of Search ................... 425/540, 541, 451.5, 425/451.6, 525

[56] References Cited

U.S. PATENT DOCUMENTS

| | | | |
|---|---|---|---|
| 2,579,399 | 12/1951 | Ruekberg | 425/342.1 |
| 2,750,625 | 6/1956 | Colombo | 425/536 |
| 2,784,452 | 3/1957 | Ruekberg et al. | 425/539 X |
| 2,901,769 | 9/1959 | Sherman et al. | 425/525 |
| 3,020,595 | 2/1962 | Szajna | 249/79 |
| 3,146,491 | 9/1964 | Eyquem | 425/531 |
| 3,305,891 | 2/1967 | Nozaki | 425/535 |
| 3,310,834 | 3/1967 | Simpson et al. | 425/152 |
| 3,496,599 | 2/1970 | Brown | 425/540 |
| 3,537,134 | 11/1970 | Raper et al. | 425/532 |
| 3,543,339 | 12/1970 | Stefaniak | 425/540 |
| 3,601,858 | 8/1971 | Blanchard | 425/214 X |
| 3,632,249 | 1/1972 | Pearson | 425/151 |
| 3,764,250 | 10/1973 | Waterloo | 425/384 X |
| 3,986,812 | 10/1976 | Barker et al. | 425/451.5 |
| 4,072,458 | 2/1978 | Schlieckmann | 425/451.6 |
| 4,523,904 | 6/1985 | Martin | 425/540 X |
| 4,648,831 | 3/1987 | Johnson | 425/540 |
| 4,650,412 | 3/1987 | Windstrup et al. | 425/182 |
| 4,698,012 | 10/1987 | Shelby et al. | 425/526 |
| 4,801,260 | 1/1989 | Oles et al. | 425/540 X |

Primary Examiner—Richard L. Chiesa
Attorney, Agent, or Firm—Renner, Kenner, Greive, Bobak, Taylor & Weber

[57] ABSTRACT

Apparatus for separating a movable mold section from a fixed mold section includes a linkage of an elongate arm pivotally mounted at about its midpoint and having a first end pivotally secured to the movable mold section and a second end in engagement with a cam for pivoting the arm. An elongate link also has one end pivotally secured to a support and its opposed end pivotally secured to the movable mold section. The pivotal mounting points of the link are disposed between the mounting points of the arm and above them whereby upon pivoting of the arm, the movable mold section is first moved away from the fixed mold section in a straight line and then in an arcuate path.

15 Claims, 7 Drawing Sheets

MOLD OPENING APPARATUS FOR BLOW MOLDING MACHINE

BACKGROUND OF THE INVENTION

This invention relates in general to a multi-station rotary blow molding machine and relates in particular to an improved mold opening and closing apparatus usable in such a machine as well as in other molding machines.

DESCRIPTION OF THE PRIOR ART

As will be noted, the present invention relates to an improved mold opening and closing apparatus which has particular utility in a rotary blow molding machine, but which could also have utility in other blow molding applications or, indeed, in other molding applications. However, for the sake of simplicity and conciseness in description and illustration, the invention will be illustrated and described in the environment of a rotary blow molding machine of the wheel type.

Rotary blow molding machines of the wheel type are well-known in the art and generally include a frame which mounts a driven, rotatable wheel which, in turn, supports a plurality of circumferentially spaced mold sets extending radially from the axis of the wheel. The wheel and the mold sets are generally rotated about a horizontal axis and opened and closed at predetermined positions through their path of movement.

Thus, the molds are moved from open to closed positions at predetermined points as the wheel rotates about its horizontal axis and, in the open position, are emptied of the cured product and injected with new charge of material which is blown so as to ultimately form a hollow container.

Blow molding apparatus of this general type is, as previously noted, well-known in the art, and examples can be seen in U.S. Pat. Nos. Johnson 4,648,831; Windstrup 4,650,412; and Shelby 4,698,012, all of which presumably are adequate for their designed purposes which is to expeditiously provide means for blow molding hollow objects such as, for example, bottles.

In conjunction with apparatus of this type, it is necessary to provide means for opening the molds quickly and effectively so as to provide access to the interior thereof, both for extraction of the finished product and injection of a new charge of material for forming the next article as well as for in-mold labelling, if desired.

In general, molds of the known prior art are designed and operated in one of two ways. One such operational design is what may be called a "clamshell" arrangement wherein the mold halves are hingedly secured to each other along one of their peripheral edges so as to pivot relatively of each other. It will be noted in that regard that, generally, in this art, one mold section is retained in a stationary position and the opposed or upper mold section moves toward and away from it during opening and closing. In the clamshell arrangement just described, during opening, the upper mold section swings away from the lower or fixed section through an arcuate path of movement. The difficulty with this approach is that, generally speaking, it is not feasible to obtain full opening and, therefore, unhampered access to the interior of the mold is, to some degree, impaired. It is also a problem with this approach that the movable mold section may not completely clear the finished product as it swings up, thereby raising the possibility of damage to the product during the demolding process.

Examples of the hinged or clamshell type arrangements just discussed can be seen in Nozaki U.S. Pat. Nos. 3,305,891 and Pearson 3,632,249.

The second common design is one in which the movable or upper mold section is moved in a straight line or radial path of movement along guide rods or slides. This approach does, indeed, fully open the interior of the mold for ready access thereto and also moves the movable mold section directly away from the fixed mold section and the finished product so as to avoid damage to it during demolding. The difficulty, however, here is that such an arrangement requires quite a bit of space in what is normally a rather constricted space.

Examples of the straight line or radial type of opening apparatus can be seen in the Johnson patent referred to above, as well as in U.S. Pat. Nos. Ruekberg 2,784,452; Columbo 2,750,625; Ruekberg 2,784,452; Szajana 3,020,595; Eyquem 3,146,491; Simpson 3,310,834; Brown 3,496,599; Raper 3,537,134; Stefaniak 3,543,339; Blanchard 3,601,858; and Waterloo 3,764,250.

The present invention is intended to overcome the difficulties encountered in the alternatives taught by the prior art by effectively attaining the desirable features of both.

SUMMARY OF THE INVENTION

It, therefore, becomes a principal object of this invention to provide a rotary blow molding assembly and improved mold opening apparatus for such an assembly whereby the advantages of both the straight line or radial and the arcuate opening movements can be combined.

To that end, it has been found that it is possible to provide a mold opening and closing linkage in which, during a portion of the opening movement, the movable mold section moves radially or in a straight line away from the fixed section, following which it pivots to move in an arcuate path and fully expose the interior of the mold to facilitate removal of the molded product.

Accordingly, production of an improved mold opening apparatus of the character above-described becomes the principal object of this invention with other objects thereof becoming more apparent upon a reading of the following brief specification considered and interpreted in view of the accompanying drawings.

DETAILED DESCRIPTION OF THE PREFERRED EMBODIMENTS

Figure 1:
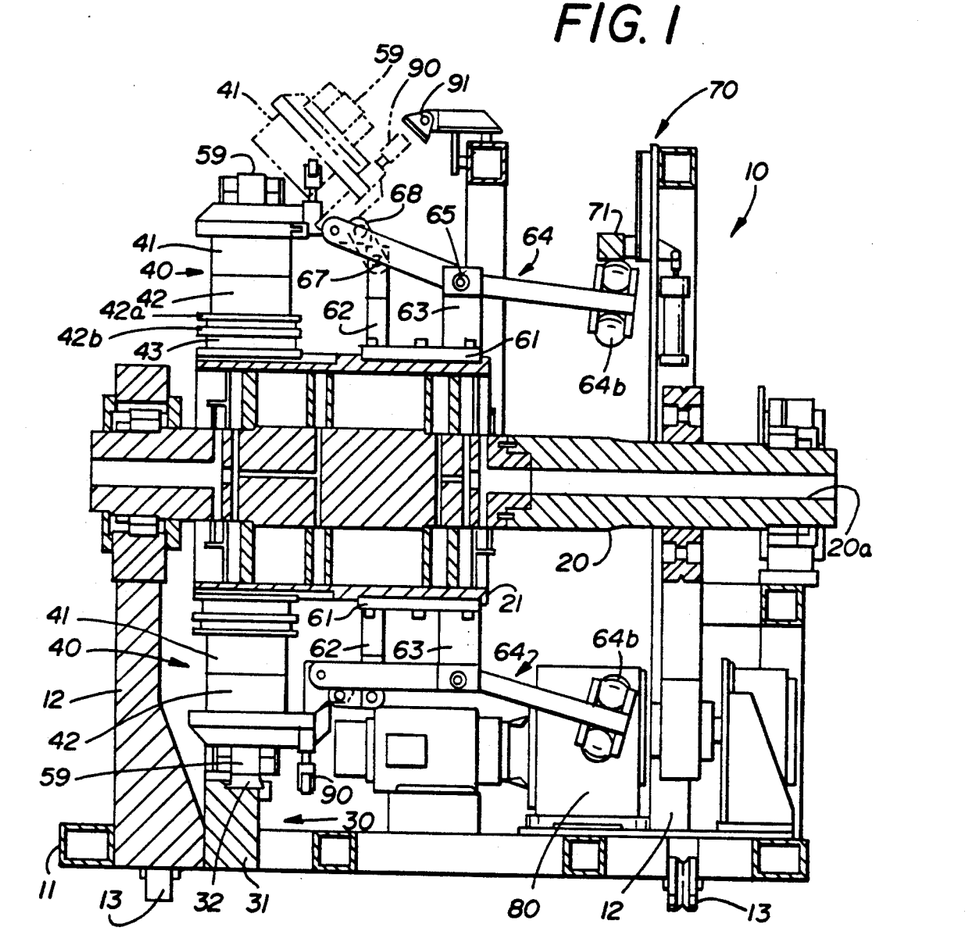
FIG. 1 is a side elevational view of the improved blow molding apparatus, partially illustrated schematically and showing a typical mold section moved between closed and open positions between a chain-dotted position and a full line position.

Referring first, then, to FIG. 1 of the drawings, it will be seen that the molding machine, generally indicated by the numeral 10, includes a base 11 and upright support frame members 12,12. These support members 12,12 carry a main shaft 20 which basically supports the wheel 21 and the molding apparatus and has a through bore 20a for the usual piping for supplying air, water and vacuum to the molds for known purposes. Frame base 11 also has wheels 13,13, two of which are preferably grooved so that the machine 10 can be moved away from the extrusion apparatus (not shown) for repair and maintenance as required.

Also referring to FIGS. 1 and 2 of the drawings, it will be seen that a compression cam arrangement 30 includes a cam support 31 mounted on base 11 and is provided with a cam liner 32 for purposes which will be described below. A second cam frame 70 is also supported on base 11 for opening and closing the molds, as will also be more fully described below.

Figure 2:
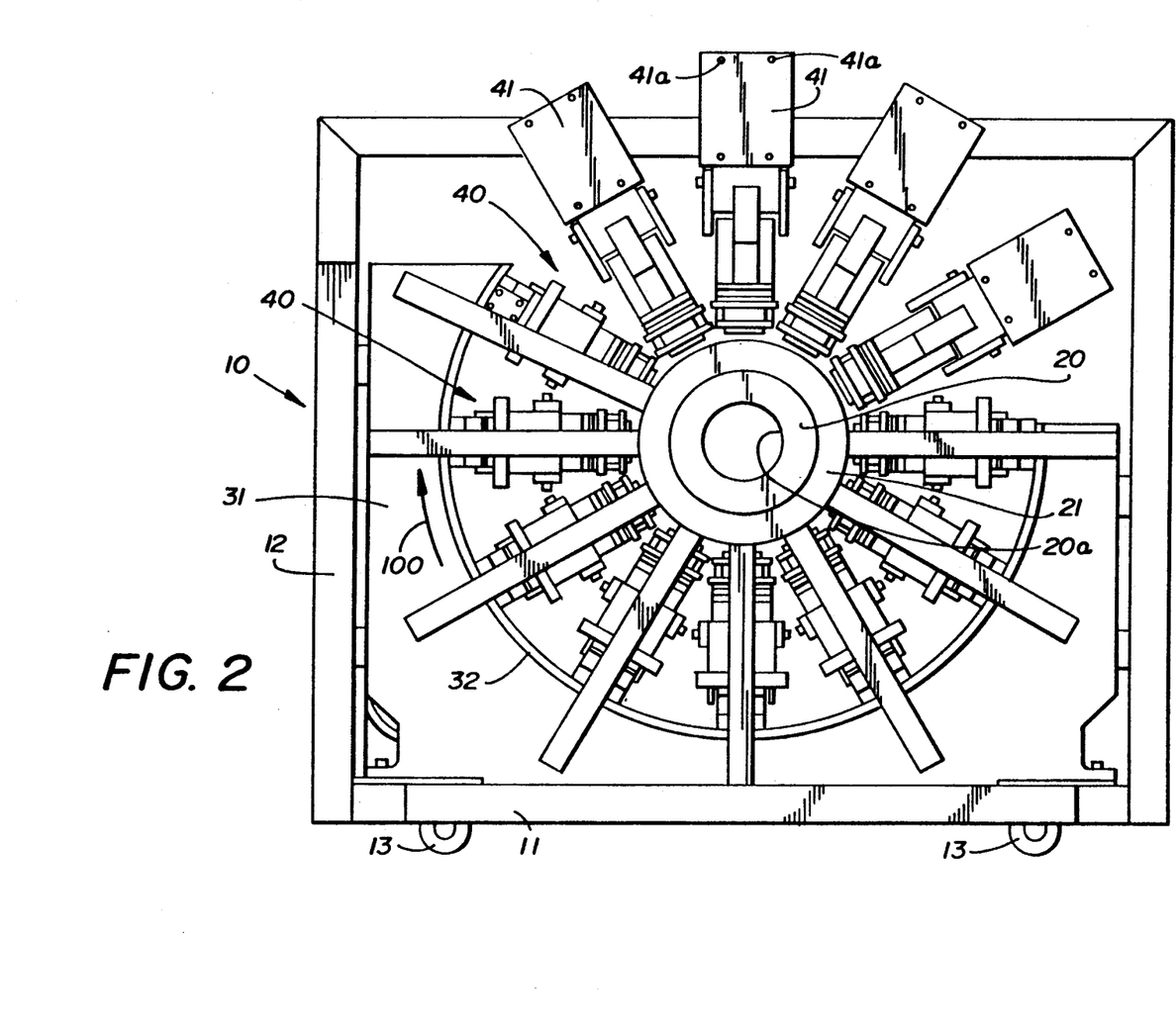
FIG. 2 is an end elevational view of the improved blow molding machine of FIG. 1.

Still referring to FIGS. 1 and 2 of the drawings, it will be seen that a plurality of mold assemblies, generally indicated by the numeral 40, are provided about the periphery of the wheel 21. These molds include upper and lower mating mold sections 41,42 which are not connected to each other, other than by mold locating pins 41a and also include spacers 43. The mold assemblies, therefore, do not function like the clamshell of the prior art described above, but are completely separable one from the other. They also do not require the slides or guide rods of the prior art straight line acting molds.

It will be understood at this point that the main shaft 20 is driven by a suitable drive means 80 and belt (not shown) and thus the wheel 21 and mold assemblies 40,40 are rotated about the axis of the main shaft. No details has been illustrated or described with regard to the means for rotating wheel 21, since such mechanisms are well-known to those of ordinary skill in this art.

The general concept of operation of the overall machine can readily be seen from FIGS. 1 and 2. Thus, drive means 80 will drive wheel 21 in a clockwise direction (see FIG. 2) in the direction of arrow 100. As each mold 40 passes the top of cam liner 32, pressure on compression roller 59 is relieved and the mold begins to open in response to cam followers 64b engaging cam 71. The usual steps of ejection or picking of the finished product by ejection means 90 and 91, labelling, if desired, and filling can then be performed, following which the mold will be closed, as described below, and, as wheel 21 continues to rotate, compression roll 59 will again engage cam liner 32 to maintain closing pressure.

Figure 3:
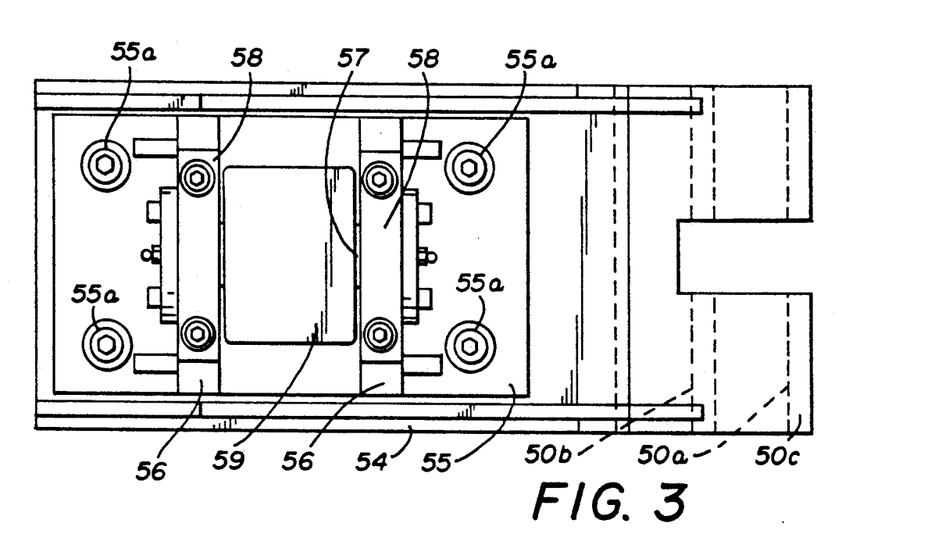
FIG. 3 is a top plan view of the mold carrier and compression roller apparatus for the upper mold section.
Figure 4:
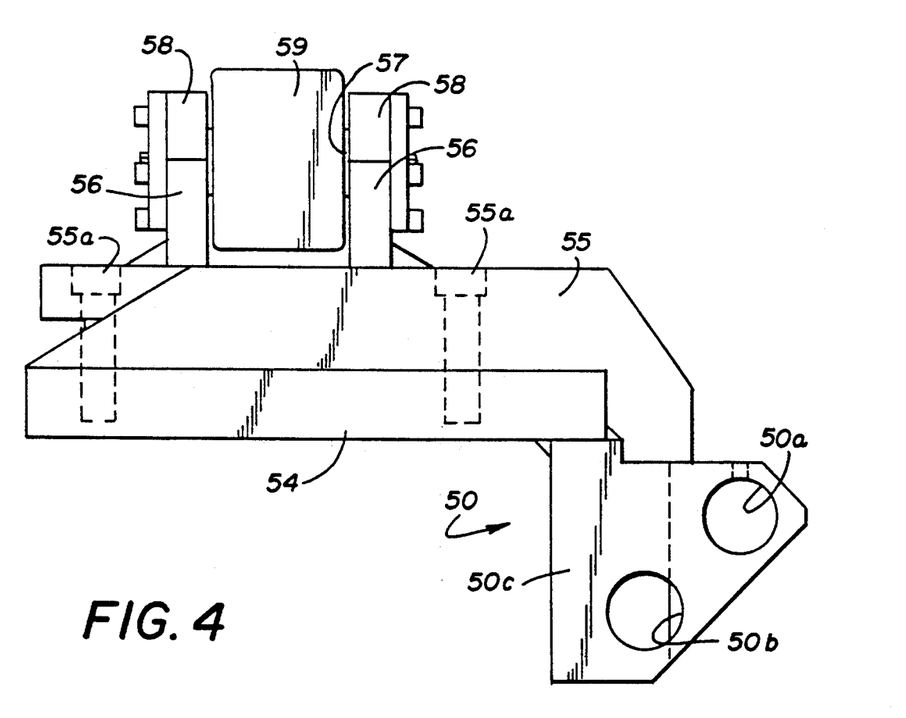
FIG. 4 is a side elevational view of the structure of FIG. 3.

Turning then to a more detailed description of the apparatus and its method of operation, it will next be noted, referring to FIGS. 3 through 6 of the drawings, that each upper mold section 41 includes, or has associated with it, a mold carrier weldment 50. The mold carrier weldment 50 has through bores 50a and 50b and extends outwardly from a main body portion 50c to the mold carrier itself, indicated by the numeral 54 of the drawings. As can be seen in FIGS. 3 and 4 of the drawings, a compression plate 55 is secured to the mold carrier 54 by suitable bolts 55a,55a.

Projecting upwardly from the compression plate 55 are a pair of brackets 56,56 which receive a shaft 57 journalled thereon and held in place by retainers 58,58. This shaft 57 carries a compression roller 59 which is rotatable so as to apply, through the brackets 56,56, pressure to the mold, as will be described more fully below.

Figure 5:
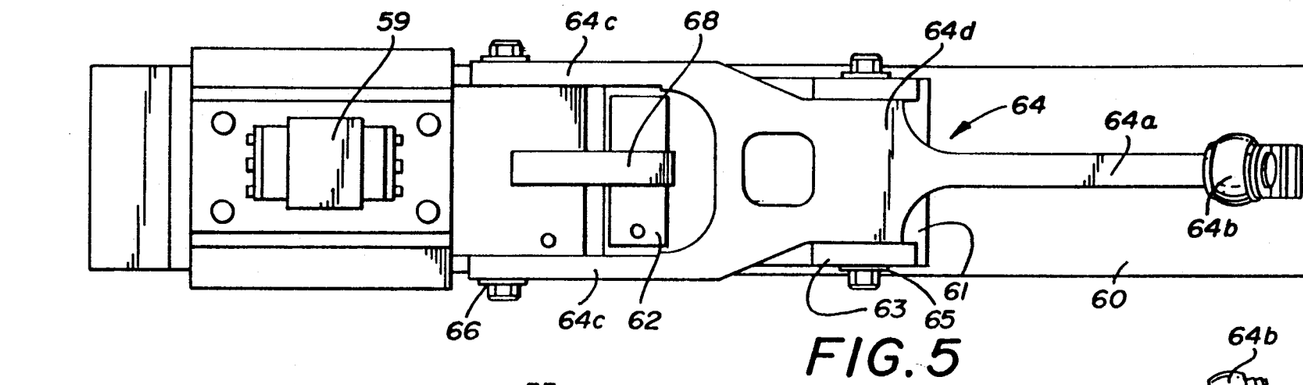
FIG. 5 is a top plan view of the mold linkage for opening the movable section of the mold.
Figure 6:
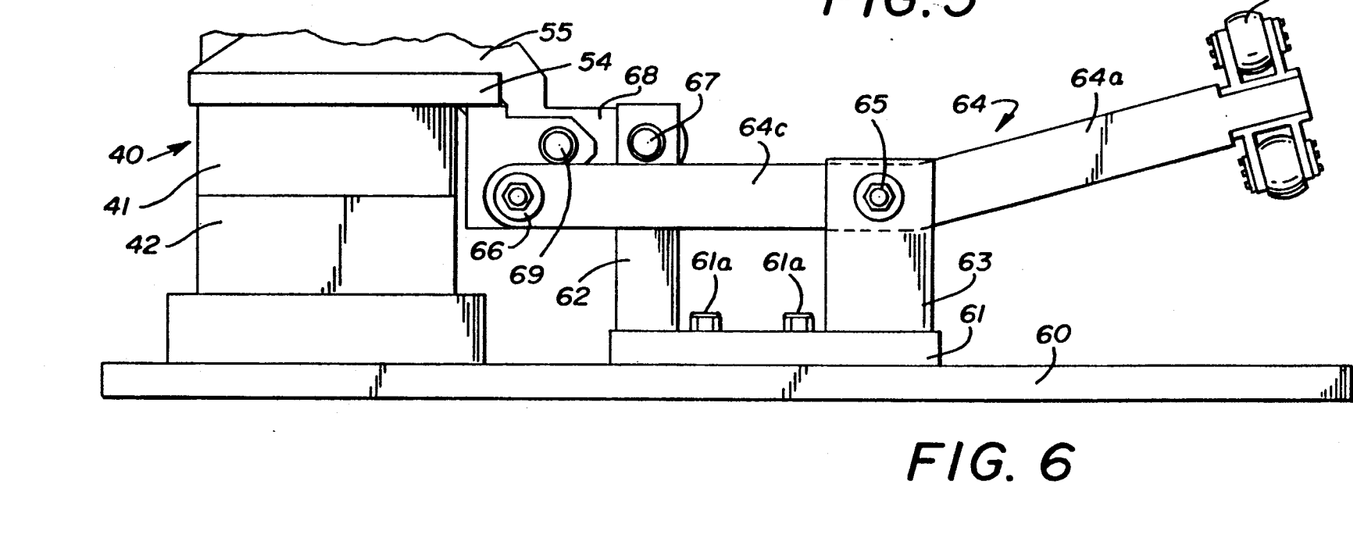
FIG. 6 is a side elevational view of the structure shown in FIG. 5 showing the mold in a fully closed position.

Also associated with each upper mold section 41 is a lift arm mount 60. Referring to FIGS. 5 and 6 of the drawings, it will be seen that each upper mold section 41 has its lift arm mount 60 provided with opposed, upwardly projecting brackets 62,63 mounted on support plate 61 by screws 61a,61a.

The lower mold section 42 is disposed, in each instance, in opposed relationship with upper mold section 41 and rests on a support plate 42a which, in turn, rests on an elastomeric compression pad 42b sandwiched between support plate 42a and spacer 43, as can be seen in FIG. 1 of the drawings. It will be understood that, as previously mentioned, lower mold section 42 and its associated support members are carried by wheel 21 for rotation therewith.

The linkage for opening and closing the molds 40 is best illustrated in FIGS. 5 through 9 of the drawings wherein it will be seen that a mold lifter arm 64 is supported on brackets 63,63 and is provided with a first portion 64a to which cam followers 64b,64b are secured for cooperation with cam 71 and a second portion consisting of bifurcated legs 64c,64c. The legs 64c,64c are joined to the first portion 64a by central portion 64d which is bored through and which receives a double-threaded pin 65 which is journalled in the opposed brackets 63,63, as can be clearly seen in FIGS. 5 through 9 of the drawings, so that mold lifter arm 64 may pivot about the axis of the pin 65.

The bifurcated legs 64c,64c are likewise provided with through bores and receive a double-threaded pin 66. This pin passes through the bores 50b,50b of main body portion 50c of mold carrier weldment 50 and thereby mounts the mold carrier weldment 50 pivotally with respect to the mold lifter arm 64.

Bracket 62, which projects from the support plate 61 of lift arm mount 60, also receives a shaft 67 which mounts a link 68. The link 68 is also secured to the mold carrier weldment 50 by shaft 69 which passes through bore 50a of mold carrier weldment 50. As can be seen from FIG. 1 of the drawings wherein the movement of the mold lifter arm 64 is clearly illustrated, it will be seen that movement of the arm will ultimately move the upper mold half 41 away from the lower mold half 42. The precise path and sequence of movement will be described below.

Referring to FIGS. 1 and 6 through 9 of the drawings again, it will be noted that, during opening, the mold lifter arm 64 is pivoted about the pin 65 from the full to the broken line position of FIG. 1. Thus, completion of the movement of the arm will result in the mold section 41 moving from the full line to the broken line position or from fully closed to fully open.

Reference to FIGS. 1 and 5 through 9 will clearly show how this opening takes place.

As can be seen, essentially a four bar linkage is employed to separate the mold sections.

This linkage consists of two stationary pivot points at 65 and 67 and two "free" pivot joint at 66 and 69.

The link between pivot points 65 and 66 is essentially the arms 64c,64c spanning the distance between the double-threaded pins 65,66 and may be referred to as the driving or input link.

The link between pivot points 66 and 69, which is essentially the mold carrier 50 itself, may be referred to as the coupler link.

The rigid link between pivot points 67 and 69, which is essentially the link member 68, may be referred to as the follower link.

A stationary or ground link may be defined as the distance between the fixed point 65 and 67 which, of course, is the base weldment itself.

In operation, it will first be understood that cam 71 is suitably configured so that, in cooperation with cam follower 64b, it will move the just described linkage through the opening and closing cycle. Thus, the input link or, in other words, the arms 64c,64c and effectively the mold lifter arm 64 itself is driven through a 30° arc in response to movement of cam follower 64b along cam 71 (see FIGS. 1 and 5 through 9) which causes the coupler link or, in other words, the mold carrier 50 to rotate eventually through a 90° arc. The movement of the mold carrier 50 and upper mold section 41 through the first few degrees of input from the arm 64 is vertical and perpendicular to the plane of lifter arm mount 60. This movement can be seen by comparing the FIG. 6 (fully closed) position with the FIG. 7 position showing the position of the mold sections following the first stage of opening movement. As can be seen, the upper mold section 41 lifts straight up from the lower mold section 42 at this point, thereby obviating possible damage to the molded part during demolding. This vertical movement also permits the use of very accurately dimensioned mold pins 41a and lessens wear on the mating surfaces of mold sections 41 and 42.

Figure 7:
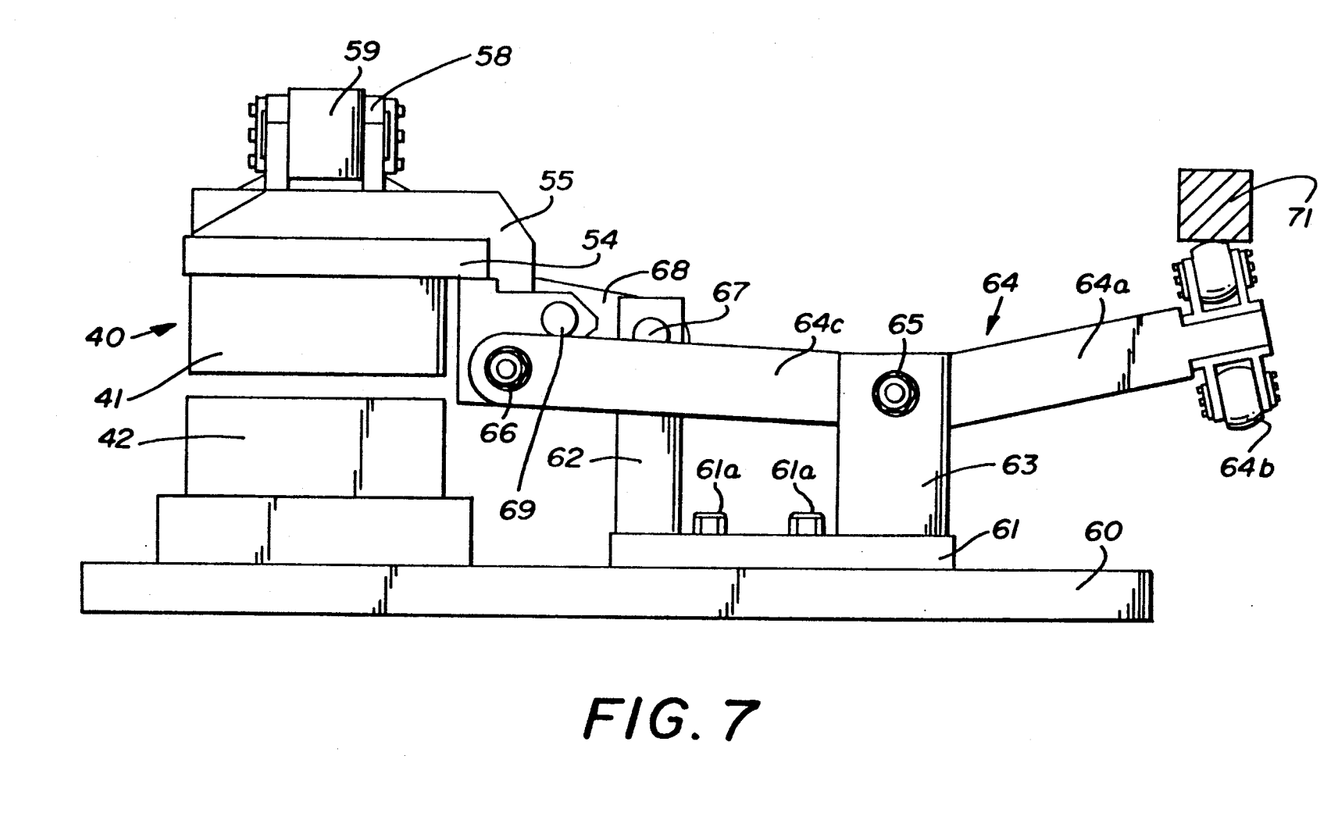
FIG. 7 is a view similar to FIG. 6 showing the mold in the first stage of its opening movement.
Figure 8:
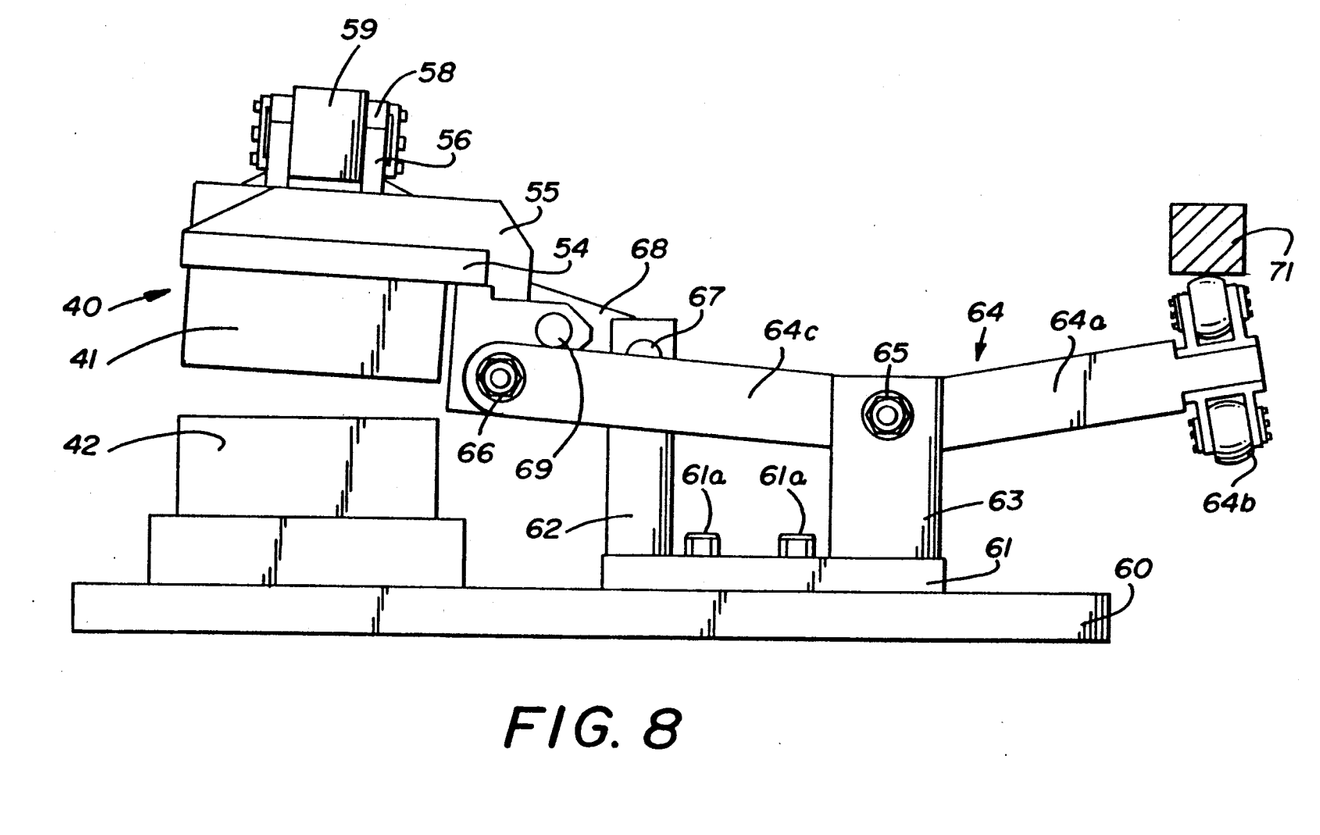
FIG. 8 is a view similar to FIGS. 6 and 7 showing the mold at the beginning of the second stage of its opening movement.
Figure 9:
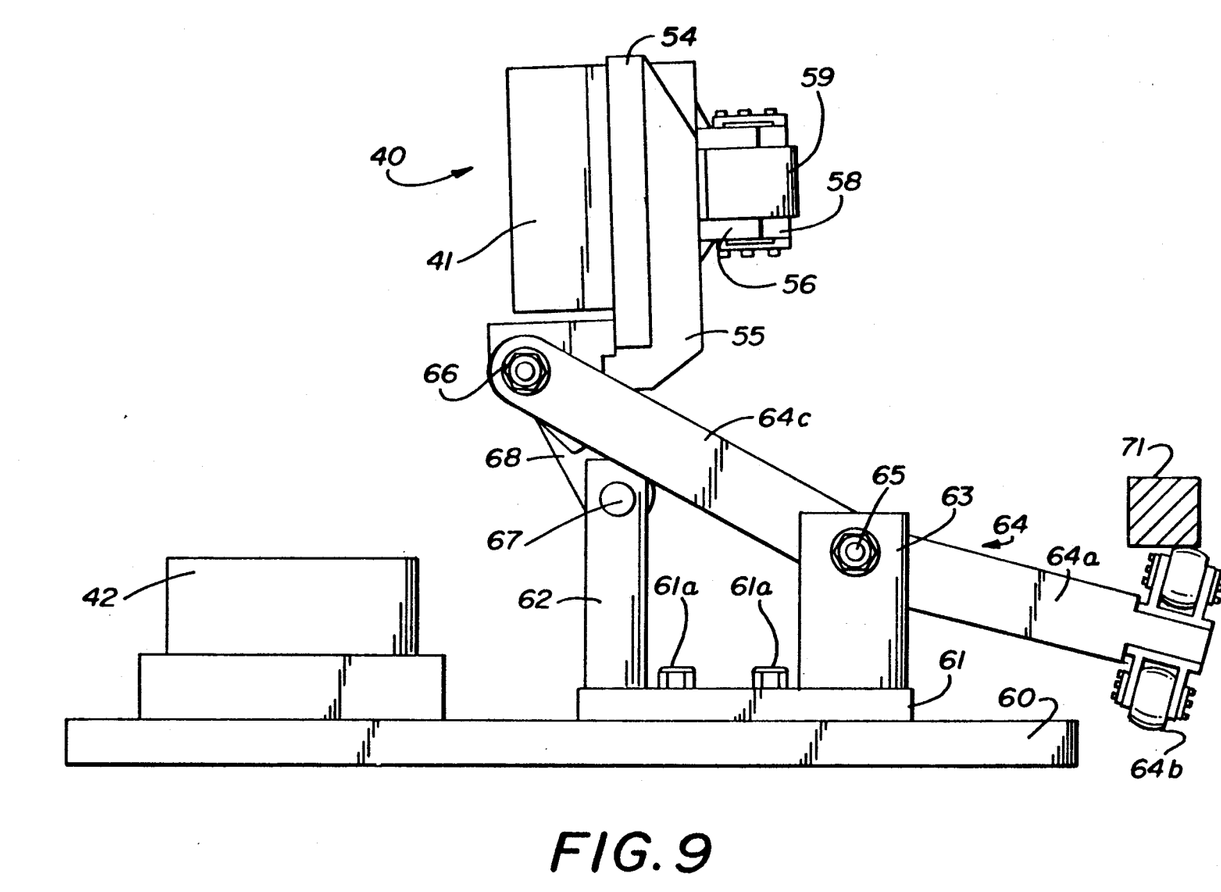
FIG. 9 is a view similar to FIGS. 6, 7 and 8 showing the mold in its fully open position.

This vertical movement is induced by the relative starting position and initial rotation of the follower link (link member 68) located between points 67 and 69 and the initial rotation of the arm 64 about shaft 65. As can be seen in FIGS. 6 and 7, as cam 71 engages cam follower 64b, arm 64 pivots about shaft 65, raising legs 64c,64c. Link member 68 will then initially push support plate 54 and mold section 41 up, in a straight line, away from mold section 42.

Subsequent rotation of arm 64 and pulling motion of link member 68 allows the upper mold section 41, once it has finished its vertical movement, to swing through a full range of arcuate movement and to fully open, as can be seen in the broken line position of FIG. 1. Obviously, ready access can then be had to the interior of the mold. Additionally, the extruder head can be directed directly inside the mold opening due to the fact that the mold is completely opened by this apparatus.

Figure 10:
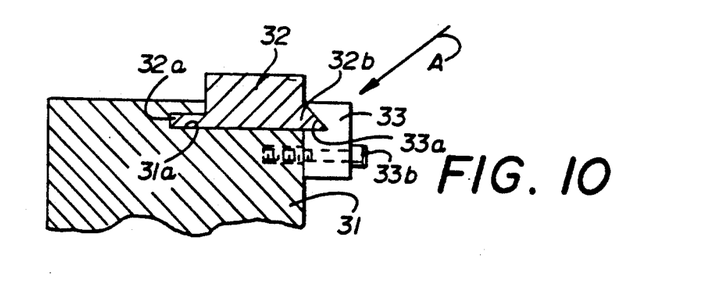
FIG. 10 is an enlarged sectional view of the cam liner mounting means.

When the improved mold closing apparatus is employed in the environment of a rotary wheel press as illustrated and described herein, a further improved feature may be seen in FIG. 10. Specifically, cam liner 32, as has already been mentioned, operates with compression roll 59 to maintain mold sections 41 and 42 in the closed position. In order to avoid stress risers in the liner, it is desirable to avoid any through apertures therein.

To that end, cam liner 32 has the cross-sectional configuration shown in FIG. 10 wherein a tail 32a projects from one side of its lower edge and an angled nose 32b projects from the opposite side. Cam support 31 is formed with a suitable recess 31a for receipt of tail 32a.

A retainer 33 is provided with a notch 33a complementally shaped to receive nose 32b in a dovetail manner and is attached to cam support 31 by bolt 33b. This arrangement causes retainer 33 to exert an angular force in the direction of arrow A to securely retain cam liner 32 in place.

While a full and complete description of the invention has been set forth in accordance with the dictates of the Patent Statutes, it should be understood that modifications can be resorted to without departing from the spirit hereof or the scope of the appended claims.

What is claimed is:

1. In a rotary molding machine having a rotatable wheel carrying at least one mold including a fixed mold section and a movable mold section mounted on the wheel, means for separating the mold sections, comprising:
    a) cam operated linkage carried by the machine and connected to the movable mold section;
    b) cam means carried by the machine for activating said linkage;
    c) said linkage including
        1) an elongate arm pivotally mounted on the machine and having a first end pivotally connected to the movable mold section,
        2) an elongate link pivotally mounted on the machine and pivotally connected to the movable mold section,
        3) the points of connection of said link with the movable mold section and the machine lying between the points of mounting of said elongate arm on the machine and its point of connection with the movable mold section; and
    d) cam follower means carried on a second end of said elongate arm for engagement with said cam means whereby said linkage is activated to move the movable mold section away from the fixed mold section first in a straight line path and then in an arcuate path.

2. The rotary molding machine of claim 1 wherein said elongate link is mounted in a plane above the plane in which said elongate arm is mounted.

3. The rotary molding machine of claim 1 wherein an elastomeric compression pad is disposed between the fixed mold section and the wheel.

4. The rotary molding machine of claim 1 wherein a compression roll is mounted on the movable mold section; said machine including second cam means for engagement with said compression roll during at least part of the rotational movement of the wheel.

5. The rotary molding machine of claim 4 wherein said second cam means include a cam support; and a cam liner secured to said cam support.

6. The rotary molding machine of claim 5 wherein a cam liner retainer is removably secured to said cam support in dovetail engagement with said cam liner.

7. In a rotary molding machine having a rotatable wheel carrying at least one mold including a fixed mold section and a movable mold section mounted on the wheel, means for separating the mold sections, comprising:
    a) cam operated linkage carried by the machine and connected to the movable mold section;
    b) cam means carried by the machine for activating said linkage;
    c) said linkage including 1) an elongate arm pivotally mounted on the machine and having a first end connected to the movable mold section at a first pivot,
2) an elongate link pivotally mounted on the machine and connected to the movable mold section at a second pivot,
3) said second pivot connection of said link with the movable mold section being displaced a distance from said first pivot connection of said elongate arm with the movable mold section; and
d) cam follower means carried on a second end of said elongate arm for engagement with said cam means whereby said linkage is activated to move the movable mold section away from the fixed mold section first in a straight line path and then in an arcuate path.

8. The rotary molding machine of claim 7, wherein said second pivot is located between the movable mold section and the point where said elongate arm is pivotally mounted on the machine.

9. The rotary molding machine of claim 7, wherein said first end of said elongate arm includes bifurcated legs and said arm is pivotally mounted on a support member on the machine at approximately its midpoint.

10. The rotary molding machine of claim 9, wherein said support member has a first projecting support bracket, said elongate arm being pivotally mounted on said support bracket.

11. The rotary molding machine of claim 10, wherein said support member includes a second projecting support bracket disposed between said first support bracket and the movable mold section, said elongate link being pivotally mounted on said second support bracket at the end opposite said second pivot.

12. The rotary molding machine of claim 11, wherein said first pivot of said elongate arm is positioned on the movable mold section at a point further from its mounting point on said first support bracket than the distance between the second pivot point and the point where said elongate link is attached to said second support bracket.

13. In a rotary molding machine having a rotatable wheel carrying at least one mold including a fixed mold section and a movable mold section mounted on the wheel, means for separating the mold sections, comprising:
a) cam operated linkage carried by the machine and connected to the movable mold section;
b) cam means carried by the machine for activating said linkage;
c) said linkage including
1) an elongate lifter arm pivotally mounted on the machine and having a first end pivotally connected to the movable mold section at a first pivot point,
2) a relatively short follower link pivotally mounted on the machine and pivotally connected to the movable mold section at a second pivot point,
3) said first and second pivot points being movable relative to said machine and fixed on said movable mold section; and
d) cam follower means carried on a second end of said arm for engagement with said cam means whereby said linkage is activated to initially substantially linearly displace said first and second pivot points to move the movable mold section away from the fixed mold section in a straight line path and then to move said first and second pivot points in different arcuate paths to rotate said movable mold section to a fully open position.

14. The rotary molding machine of claim 13, wherein said lifter arm is pivoted where mounted on the machine by action of said cam means operating at said second end of said lifter arm.

15. The rotary molding machine of claim 14, wherein said cam means pivots said lifter arm through an angle of approximately 30 degrees to effect rotation of said movable mold section through an angle of approximately 90 degrees.

* * * * *

UNITED STATES PATENT AND TRADEMARK OFFICE
CERTIFICATE OF CORRECTION

PATENT NO. : 5,225,216
DATED : July 6, 1993
INVENTOR(S) : Dominic A. Barracchini, Thomas D. Cleland, and Derris Cottrell It is certified that error appears in the above-identified patent and that said Letters Patent is hereby corrected as shown below:

Column 2, line 18, "Ruekberg 2,784,452;" should read --Ruekberg 2,579,399--.

Column 3, line 45, "details" should read --detail--.

Column 4, line 68, "joint" should read --joints--.

Signed and Sealed this

Fifth Day of July, 1994

Attest:

BRUCE LEHMAN

Attesting Officer

Commissioner of Patents and Trademarks